United States Patent
Lewis (10) Patent No.: US 10,890,963 B2
(45) Date of Patent: Jan. 12, 2021

(54) SYSTEM AND METHOD FOR PLATFORM SLEEP STATE ENHANCEMENTS USING NON-VOLATILE DUAL IN-LINE MEMORY MODULES

(71) Applicant: Insyde Software Corp., Taipei (TW)

(72) Inventor: Timothy Andrew Lewis, El Dorado Hills, CA (US)

(73) Assignee: Insyde Software Corp., Taipei (TW)

( * ) Notice: Subject to any disclaimer, the term of this patent is extended or adjusted under 35 U.S.C. 154(b) by 55 days.

(21) Appl. No.: 16/200,204

(22) Filed: Nov. 26, 2018

(65) Prior Publication Data

US 2019/0163256 A1     May 30, 2019

Related U.S. Application Data

(60) Provisional application No. 62/590,526, filed on Nov. 24, 2017.

(51) Int. Cl.
| | |
|---|---|
| *G06F 1/3287* | (2019.01) |
| *G06F 3/06* | (2006.01) |
| *G06F 9/4401* | (2018.01) |
| *G06F 1/3234* | (2019.01) |

(52) U.S. Cl.
CPC .......... *G06F 1/3287* (2013.01); *G06F 1/3275* (2013.01); *G06F 3/0625* (2013.01); *G06F 3/0647* (2013.01); *G06F 3/0685* (2013.01); *G06F 9/4418* (2013.01)

(58) Field of Classification Search
CPC .... G06F 1/3275; G06F 1/3287; G06F 3/0625; G06F 3/0647; G06F 3/0685; G06F 9/4418
See application file for complete search history.

(56) References Cited

U.S. PATENT DOCUMENTS

| | | | | |
|---|---|---|---|---|
| 7,830,732 | B2* | 11/2010 | Moshayedi | G11C 5/04 365/189.17 |
| 9,502,082 | B1* | 11/2016 | Dang | G11C 5/147 |
| 10,241,727 | B1* | 3/2019 | Shallal | G06F 12/0802 |
| 2014/0337589 | A1* | 11/2014 | Carpenter | G06F 3/0632 711/157 |
| 2017/0351616 | A1* | 12/2017 | Juenger | G06F 9/4418 |
| 2018/0011714 | A1* | 1/2018 | Han | G06F 3/0604 |
| 2018/0314511 | A1* | 11/2018 | Butcher | G06F 8/654 |

(Continued)

OTHER PUBLICATIONS

Chang et al., NVDIMM-N Cookbook: A Soup-to-Nuts Primer on Using NVDIMM-Ns to Improve Yoru Storage Performance. SNIA Global Education. Slideshow, 41 pages, (2015).

(Continued)

*Primary Examiner* — Glenn A. Auve (74) *Attorney, Agent, or Firm* — McCarter & English, LLP; John S. Curran (57) ABSTRACT

A system and method for performing sleep state enhancements in a computing device using firmware and NVDIMMs that include DRAM and flash memory is discussed. The flash-backed DRAM covers all of platform memory. All writes to DRAM during system operation are propagated to the flash. Sleep state requests trigger a System Management Interrupt and a firmware a SMI handler handles the sleep state request so as to enable power savings during the sleep state and facilitate faster resume times when exiting the sleep state.

18 Claims, 6 Drawing Sheets

(56) References Cited

U.S. PATENT DOCUMENTS

2018/0349225 A1* 12/2018 Bishnoi .................... G06F 1/30
2019/0018712 A1* 1/2019 Foxworth ............. G06F 1/3234

OTHER PUBLICATIONS

Rothman, Reducing Platform Boot Times. IDF2009, Intel Developer Forum, Best Technical Methods for Unified Extensible Firmware Interface (UEFI) Development. 45 pages, (2009).
Sainio, NVDIMM—Changes Are Here so What's Next? In-Memory Computing Summit. Slideshow, 22 pages, (2016).
Shimpi, Intel's Haswell Architecture Analyzied: Building a New PC and a New Intel. AnandTech, 28 pages, Oct. 5, 2012.
Uefi, vol. 1: Platform Initialization Specification. Pre-EFI Initialization Core Interface. Version 1.5. United EFI, Inc. 291 pages, Jul. 29, 2016.
Uefi, vol. 2: Platform Initialization Specification. Driver Execution Environment Core Interface. Version 1.5. United EFI, Inc. 240 pages, Jul. 28, 2016.
Uefi, vol. 3: Platform Initialization Specification. Shared Architectural Elements. Version 1.5. United EFI, Inc. 368 pages, Jul. 28, 2016.
Uefi, vol. 4: Platform Initialization Specification. Management Mode Core Interface. Version 1.5. United EFI, Inc. 358 pages, Jul. 28, 2016.
Uefi, vol. 5: Platform Initialization Specification. Standards. Version 1.5. United EFI, Inc. 376 pages, Jul. 28, 2016.

* cited by examiner

SYSTEM AND METHOD FOR PLATFORM SLEEP STATE ENHANCEMENTS USING NON-VOLATILE DUAL IN-LINE MEMORY MODULES

RELATED APPLICATION

This application is related to, and claims the benefit of, U.S. Provisional Patent Application No. 62/590,526, filed Nov. 24, 2017, the contents of which are incorporated herein by reference in their entirety.

BACKGROUND

Computing devices are initialized by firmware included within the device and this firmware provides a range of software services which facilitate the boot of the operating system (OS) as well as providing a smaller subset of these services that continue to be available after the operating system has booted. Firmware is software that has been written onto non-volatile Read-Only Memory (ROM) modules including, but not limited to, ROM, PROM, EPROM, EEPROM, and Flash memory (collectively referred to hereafter as "ROM"). A characteristic of non-volatile memory is that it retains data when power is withdrawn. In contrast, volatile memory loses data in the absence of power. For example, volatile Random Access Memory (RAM) loses its data when a computer is shut down while the various types of non-volatile ROM maintain their data through shutdown and re-boot. Among other services, the firmware is responsible for operation of the computing device until a boot process can be run which loads an operating system for the computing device into memory. Once loaded, the operating system is in charge of normal operation of the computing device although the provision of certain services after loading of the operating system may require a transition of control from the operating system back to the firmware for security and other reasons.

Unified Extensible Firmware Interface (UEFI) is a specification created by a non-profit industry body detailing a programming interface between the Operating System and the included firmware of a computing device such as, but not limited to, a Personal Computer (PC). The UEFI specification describes a set of tools by which a computing device can move in an organized fashion from the power-applied state to fully operational. The specification tells the desired result but deliberately does not specify the internal tactic of implementation. The UEFI firmware specification replaces earlier OS/firmware interfaces previously used by the industry and commonly known as legacy BIOS.

When implemented in a computing device, the machine codes for UEFI firmware and all permanent data used by the firmware reside in Read Only Memory (ROM). In many cases the ROM is an Electrically Erasable silicon device known as a flash ROM. Flash ROM has the characteristic that it can be erased by electrical command and individual elements may then be written and the device will retain the data indefinitely. When power is first applied to the computing device, the system executes a process called reset which clears the state to a known condition and begins execution of the firmware. The firmware is read from the flash ROM or other ROM in the computing device.

The ROM in a computing device may be partitioned into several functional divisions or regions. One such region is the code store which must be protected from alteration by any entity except for entities that have been authorized to update the code store. A second region called the Authenticated Variable Region or Store holds Authenticated Variables defined in the UEFI specification and is used to hold UEFI-defined security information (the security database). In addition to the UEFI-defined information the Authenticated Variable Store can be used to store user-defined data related to the ultimate uses of the computer. Because it contains security data and potentially sensitive user data, the UEFI specification provides that the Authenticated Variable Region/Store must be protected from alteration by any entity except those authorized by the presence of identifying key data within the security database. A third region, the UEFI variable store, contains lower security information which may be freely updated by user programs.

The computing device contains one or more elements known as Central Processing Units (CPU) which, when in operation, can read from and also erase and/or write flash ROM. The CPU has a normal operating mode and a second operating mode called System Management Mode (SMM). When the CPU is in normal operating mode it can access all elements of the computer except certain memory regions exclusively dedicated to SMM mode. In contrast, when the CPU is operating in SMM mode it is able to access all elements of the computing device including the dedicated memory. An electrical signal is made available within the circuitry of the computing device which can indicate when the CPU is operating within SMM. The CPU device may be directed to transition from normal operating mode to SMM by a number of triggers called System Manage Interrupt (SMI) events including SMI events triggered by firmware. The exact triggers available differ somewhat from among system designs but the result when the platform appropriate trigger is used is always that execution in main memory is immediately suspended and execution begins at a specific location in SMM memory.

BRIEF SUMMARY

Embodiments of the present invention provide a system and method in which, on systems where non-volatile DIMMs (NVDIMMs) that support memory-mapped DRAM cover all of platform memory, firmware can enhance the ACPI-defined sleep states for faster suspend/resume time and greater power savings. With these NVDIMMs, each byte of DRAM is backed up by a byte of flash and all writes to the DRAM are propagated automatically to the flash. This allows firmware-based enhancements to the S3, S4 and "modern" standby (S0ix) sleep states since the DRAM can be turned off completely during suspend and the contents of the DRAM do not need to be restored on resume. Firmware manages the suspend and resume processes and uses knowledge of the platform to enhance the processes.

In one embodiment, a computer device-implemented method for sleep state enhancement for the computing device uses firmware and non-volatile dual inline memory modules (NVDIMMs). The method provides flash-backed Dynamic Random Access Memory (DRAM) for all of platform memory for the computing device via one or more NVDIMMs in the computing device, each of the one or more NVDIMMs including DRAM and flash memory and lacking supercapacitors. The method propagates all writes to DRAM to flash during operation of the computing device and detects a sleep state request. The method also generates s System Management Interrupt (SMI) based on the detected sleep state request and invokes System Management Mode based on the SMI. Additionally, the method polls, with a firmware SMI handler operating in SMM, a status of a flash backup process responsible for propagating the writes to DRAM to flash. The method further identifies a completion of the backup process based on the polling and powers off the one or more NVDIMMs prior to entering a sleep state associated with the sleep state request and after the completion of the backup process. The method enters the sleep state. The method also returns control of the computing device to an operating system and exits SMM using the firmware.

In another embodiment, a computing device is configured to enhance sleep states using firmware. The computing device includes at least one processor, an operating system and one or more non-volatile dual inline memory modules (NVDIMMs) providing flash-backed Dynamic Random Access Memory (DRAM) for all of platform memory for the computing device. Each of the one or more NVDIMMs includes DRAM and flash memory and lacks supercapacitors. All writes to DRAM are propagated to flash during operation of the computing device. The computing device also includes firmware that when executed detects a sleep state request and triggers a System Management Interrupt (SMI) based on the detected sleep state request that transitions the computing device to System Management Mode (SMM). Additionally, the firmware when executed polls with an SMI handler operating in SMM, a status of a flash backup process responsible for propagating the writes to DRAM to flash. The firmware when executed identifies a completion of the backup process based on the polling. The one or more NVDIMMs are powered off prior to the computing device entering a sleep state associated with the sleep state request and after the completion of the backup process and computing device enters the sleep state. The firmware when executed also returns control of the computing device to the operating system when exiting SMM.

BRIEF DESCRIPTION OF THE DRAWINGS

The accompanying drawings, which are incorporated in and constitute a part of this specification, illustrate one or more embodiments of the invention and, together with the description, help to explain the invention. In the drawings.

DETAILED DESCRIPTION

Dynamic Random Access Memory (DRAM) is a type of random access semiconductor memory. DRAM is frequently used as main memory for a computing device and graphics memory in a graphics card. DRAM stores each bit of data in a separate capacitor within an integrated circuit. The capacitor can either be charged or discharged and thus the state of the capacitor represents the two values of a bit (0 and 1). The electric charge on the capacitors slowly dissipates with time and needs to be refreshed periodically so that data on the chip not lost. To prevent this, DRAM requires a power source and periodic instructions to rewrite the data in the capacitors, restoring them to their original charge and value. In some instances, the DRAM may be capable of a self-refresh and not require any external logic to instruct the DRAM to refresh.

NVDIMMs include both volatile DRAM (such as provided in a traditional Dual In-Line Module (DIMM)) as well as slower but less expensive non-volatile flash memory and are being increasingly deployed in various computing platforms. The Joint Electron Device Engineering Council (JEDEC) provides standards for computer memory. JEDEC defines three types of NVDIMMs: NVDIMM-N, NVDIMM-F and NVDIMM-P.

An NVDIMM-N includes memory-mapped DRAM. Flash is not system mapped. Access methods include direct byte or block oriented access to DRAM. DRAM capacity may be 1-10 GB. DRAM latency is 10 s of nanoseconds. The NVDIMM-N includes an energy source for backup.

An NVDIMM-F includes memory mapped flash but the DRAM is not system mapped. The NVDIMM-F provides block oriented access through a command buffer. NAND capacity may be 100 s of GB to 1 TB. NAND latency is 10 s of microseconds.

An NVDIMM classified as NVDIMM-P is a combination of the two other types of NVDIMMs and includes both memory mapped flash and memory mapped DRAM allowing for byte or block addressability. Capacity may be 100 s of GB to 1 TB. Latency may be in the 100 s of nanoseconds.

For NVDIMM-N one of the key aspects of current NVDIMM design is the use of super capacitors, also referred to herein as "super-caps", to ensure that all data that is in the NVDIMM's DRAM has been written back to the NVDIMM's flash before all power is lost. The super-caps act, in effect, as batteries to keep the NVDIMMs alive long enough to flush all unwritten data, in case of an unexpected power failure. Similar techniques are used with the NVDIMM-F to make sure all data is written to the flash "disk". In one configuration, super-caps are connected to the NVDIMM via a tether cable to provide power.

Figure 1:
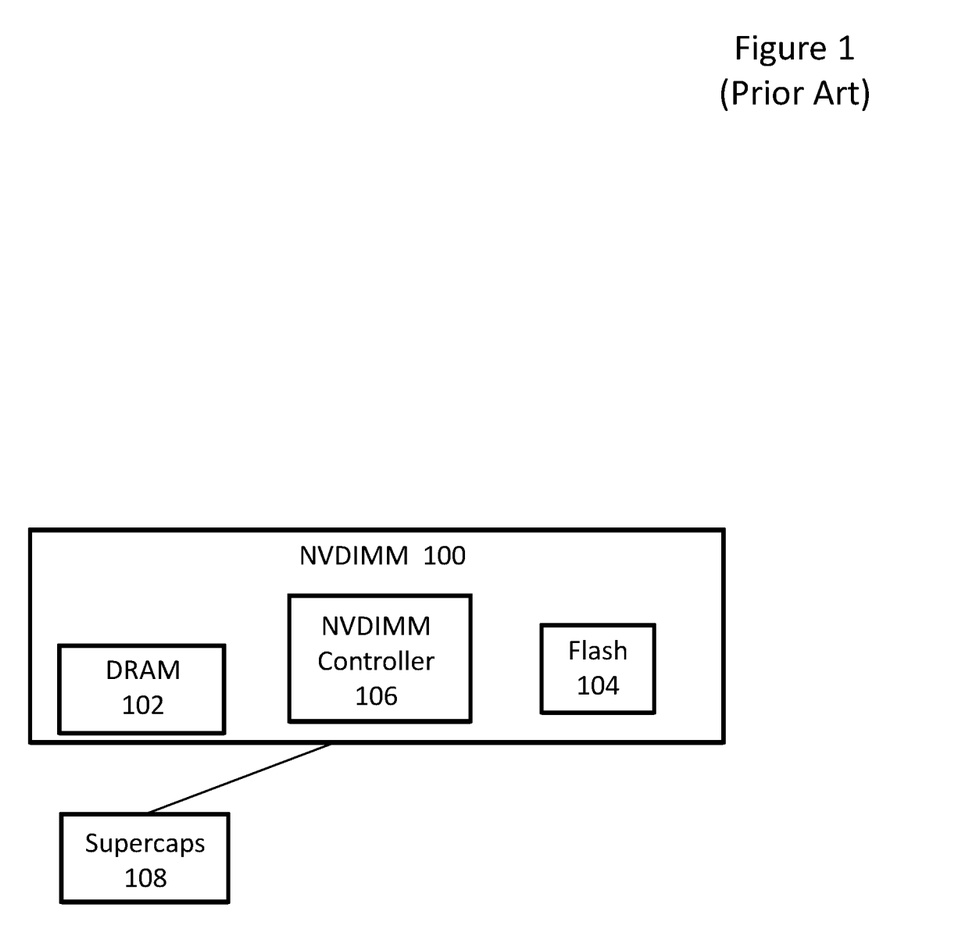
FIG. 1 (prior art) depicts an NVDIMM.

FIG. 1 (prior art) depicts an NVDIMM. The NVDIMM 100 includes volatile memory in the form of DRAM 102 and non-volatile memory in the form of flash memory 104. NVDIMM 100 also includes a NVDIMM memory controller 106. Supercaps 108 provide an emergency energy source to supply power in the event of a power loss so that data from DRAM 102 can be written to flash 104 in the event of an unexpected power loss.

Figure 2:
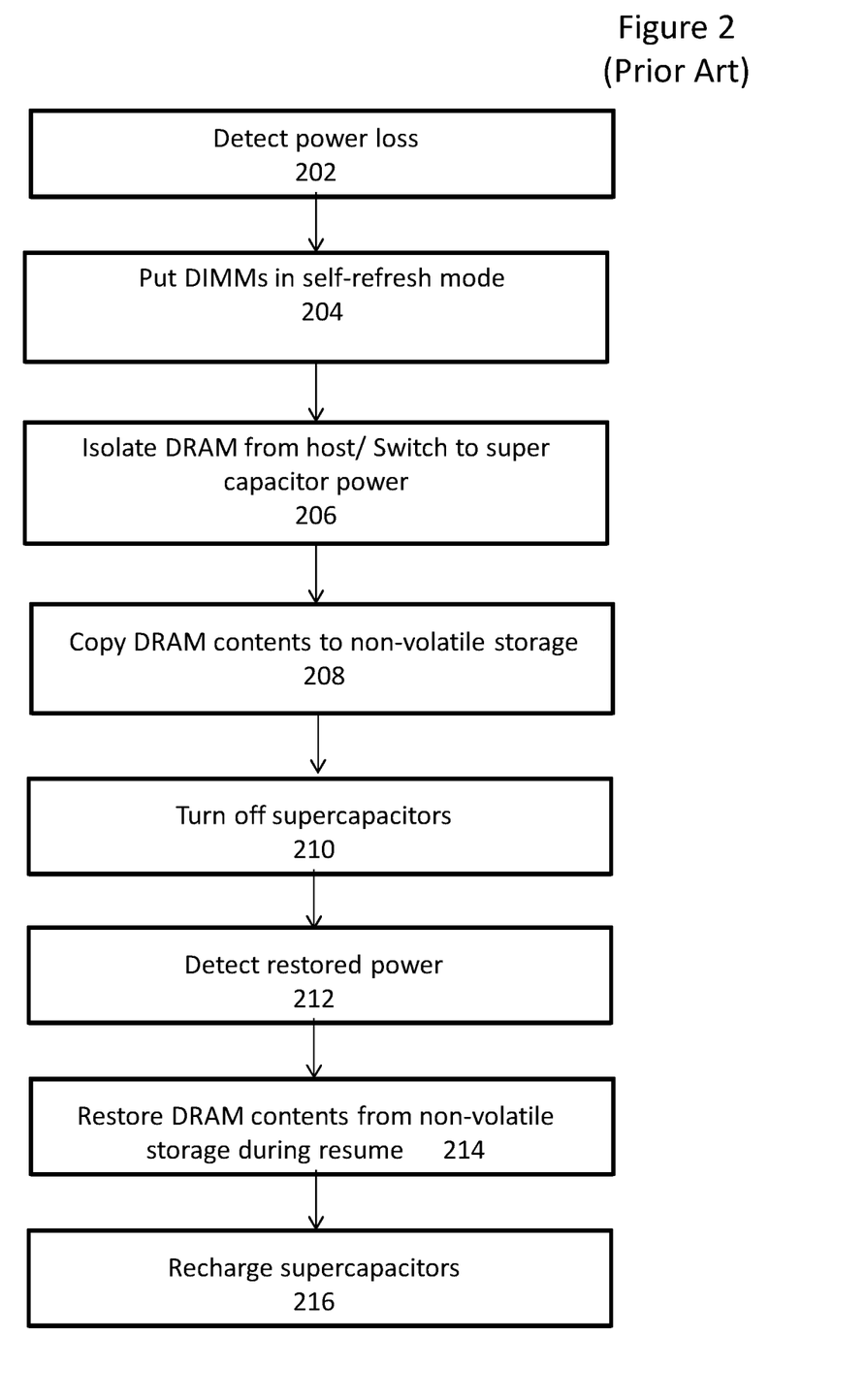
FIG. 2 (prior art) depicts a sequence of steps in a computing device to respond to a detected sleep state request/loss of power using super capacitors.

As mentioned above, super capacitors are used to provide an emergency power source in the event of unexpected power loss. FIG. 2 (prior art) depicts a conventional sequence of steps in a computing device to respond to a detected loss of power using super capacitors. When the system detects an unexpected power loss (step 202) the firmware on the computing device puts the DIMMs/NVDIMMs in self-refresh mode (step 204). The DRAM is isolated from the host system and a switch is made for the DRAM to super capacitor power (step 206). The super capacitors supply enough power to copy the contents of DRAM to non-volatile storage (step 208). The non-volatile storage may be flash on an NVDIMM or a hard drive for example. Following completion of the copying of the DRAM contents, the super capacitors may be turned off (step 210). Once a restoration of power is detected (step 212), the firmware initiates resume by beginning a boot sequence that restores DRAM contents from the non-volatile storage (step 214) and recharges the super capacitors (step 216). It should be noted that this sequence requires the use of super capacitors which add to the cost of the computing platform and take up board space which is in short supply on mobile devices. Additionally, both the suspension and resumption of platform operations are delayed in this sequence based on the need to wait for the copying operations of the DRAM content to complete during suspend operations and the need to wait for the super capacitors to charge during resume operations.

The Advanced Configuration and Power Interface (ACPI) is an industry specification for handling power consumption in computing devices and defines six basic system power states: S0 (on)→S5 (off). Other than S0, the states describe gradually greater degrees of power savings (i.e.: S3 saves more power than S1) and greater lengths of time before the system is available to the user (i.e.: S5 requires more time to respond than S3). The following terms relevant to sleep states are defined in the ACPI Specification, version 5.0 (Dec. 6, 2011):

Sleep Control Register: ACPI defines two different sleep control registers: PM1 Control (section 4.8.1) and Sleep Control (section 4.8.3.7). The former is used when the system is not classified as hardware-reduced (see HW_RE-DUCED_ACPI, table 5-35) and the latter is used when the system is classified as hardware-reduced.

Sleep Control Value: ACPI defines different values that should be written to the SLP_TYP field of the PM1 Control or Sleep Control register, based on which sleep-state the operating system desires to transition to. The operating system retrieves these values from the _Sx ACPI object (which x is the sleep state desired). See section 7.3.4.

Conventionally, S3 is a low power state where the CPU is powered off and the DRAM is placed into a minimum power state that allows its data to be maintained so that it is quickly available upon resume. Because DRAM is volatile the memory must be periodically refreshed with the data being read from the memory and immediately written back to the same location in order to be maintained. Conventionally the low power state of an S3 sleep state saves power but does require some power to refresh the memory in the DRAM. For example, DIMMs placed in self-refresh mode typically consume 0.2 w to 0.5 w.

Embodiments of the present invention enable a computing device/computing platform equipped with one or more NVDIMMs that provide flash-backed DRAM for all of device/platform memory to save power during an S3 sleep state and also speed resumption from the S3 sleep state using a firmware-based approach. In one embodiment a computing system with a CPU includes at least one NVDIMM that provides flash-backed DRAM for all of the platform memory. With this configuration, all writes to DRAM memory locations may also be propagated to flash memory on the NVDIMM thus providing a continuously backed up copy of the DRAM contents. In this embodiment, upon entering S3, the power to memory can be completely removed since the DRAM data is already backed up on flash thus saving the amount of power that otherwise would have been used to self-refresh the DRAM during the S3 sleep state.

The entry into an S3 sleep state is always initiated, by the user, software or the OS. According to the ACPI specification, the S3 state is entered when a platform-specific value (S3 in the ACPI tables) is written to the Sleep Type (SLP_TYP) register and the Sleep Enable (SLP_EN) bit is set to 1. On many systems, the chipset that provides this S3 functionality can optionally generate an SMI when the Sleep Enable (SLP_EN) register bit is set instead of actually transitioning the system into the S3 state. In an embodiment, the computing platform does not have super capacitors to provide power to NVDIMMs. Rather, an SMI causes entrance into SMM where the handler for the SMI polls the status of the backup process in the NVDIMM and, when complete (i.e. when DRAM contents have been copied to flash), disables the SMI generation and transitions the computing device/platform into S3. The status of the backup process may be available from a chipset provided register, or through the I2C bus connected to the NVDIMM (per the JEDEC specification). This allows the computing device/platform to not carry super-caps, which cost money and which take board space (which is precious on mobile platforms). This approach also speeds the boot time as the conventional boot process must wait for the super-caps to charge and must wait for the save to complete, neither of which is now required. On ARM platforms, the equivalent functionality may be found using the MMI and MM (UEFI PI specification 1.6) or using TrustZone and an interrupt that transitions to secure mode.

Figure 3:
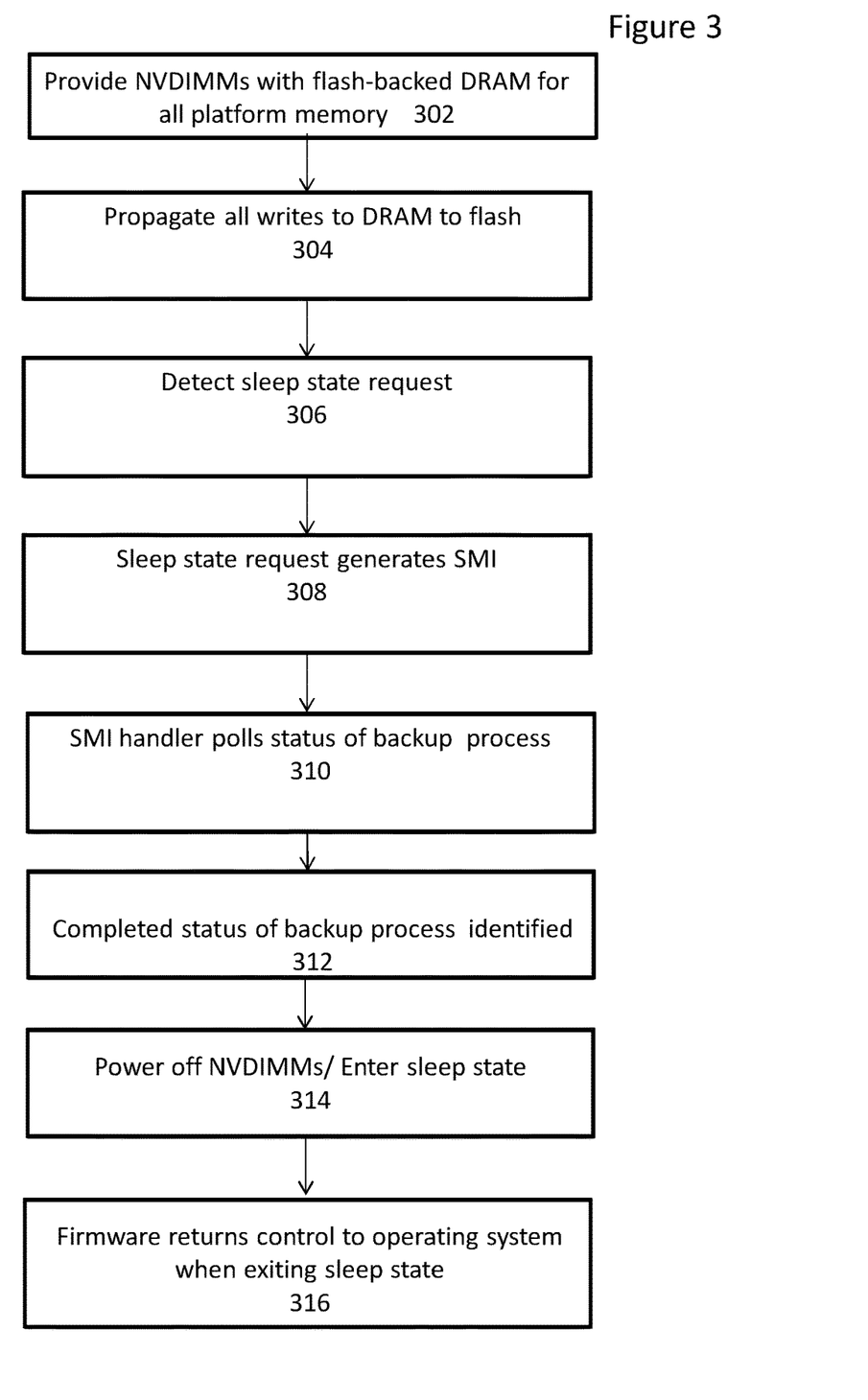
FIG. 3 depicts an exemplary sequence of steps performed to enhance a sleep state request in an exemplary embodiment.

FIG. 3 depicts an exemplary sequence of steps performed to enhance a sleep state request using firmware in an exemplary embodiment. The sequence begins by providing one or more NVDIMMs with flash-backed DRAM for all platform memory (step 302). Of note, the NVDIMMs are not connected to supercapacitors. All writes to DRAM are propagated to flash by the microcontroller on the NVDIMM device (step 304). Upon detection of a sleep state request (step 306), the system firmware generates an SMI (step 308) and the firmware SMI handler in SMM polls the state of the on-NVDIMM microcontroller's backup process in charge of copying DRAM contents to flash to determine a status of the backup process (i.e. to determine whether the backup process has completed copying the DRAM contents to flash) (step 310). After the polling identifies a completed status of the backup process (step 312), the NVDIMMs are powered off before the sleep state is entered (step 314). Because all of the data has already been propagated to flash, the NVDIMMs can be completely powered off during the sleep state as there is no need to perform refresh for the DRAM during sleep resulting in savings over a typical S3 state. After the backup process has completed, the NVDIMMs may be powered off either by the firmware prior to the sleep state being invoked or by the chipset after the sleep state is invoked but before it is entered. The firmware subsequently returns control of the computing device to the operating system to allow the resumption of normal operation of the computing device after exiting the sleep state (step 316). This sequence avoids the need for super capacitors in general resulting in a cost savings and more available space in the computing device. Additionally, the lack of super capacitors saves the time ordinarily spent in waiting for them to charge. For S4 requests, this approach avoids the need to write to a hard disk and read back from the hard disk (when entering and exiting S4).

In one embodiment, the NVDIMMs are powered-off before invoking the sleep state by invoking the sleep state while executing out of flash or CPU cache. In another embodiment, the sleep state invocation may be tied to the powering off of the NVDIMM.

In one embodiment, as part of the resume process from the S3 sleep state, the firmware identifies the NVDIMMs and, if the NVDIMM contains valid data, begins the restore process by copying the contents of the flash portion of the NVDIMM back into the DRAM portion of the NVDIMM. In another embodiment, to provide a quicker resumption from the S3 sleep state, the DRAM contents are instead marked as "invalid" by the firmware instead of being copied from flash during resume. On a future read to an address, the tag for that address in DRAM indicates that it is no-filled, which will generate a flash read and, subsequent to that flash read, a write to the DRAM. This latter method can speed the booting process, since many memory locations are not initially needed when resuming normal operation of the computing device. It should be noted that a downside with this method of marking DRAM contents invalid is that latency is unpredictable, which may break a design contract between the DRAM and the memory controller (e.g.: DRAMs should respond in N nanoseconds). Accordingly, to address this latency issue, in another embodiment, the system is started in an on-demand mode, but before actually launching the OS, the firmware pauses the system and waits for all DRAM to be filled. This allows the "filling" of DRAM to happen in the background while other initialization tasks are being performed.

Figure 4A:
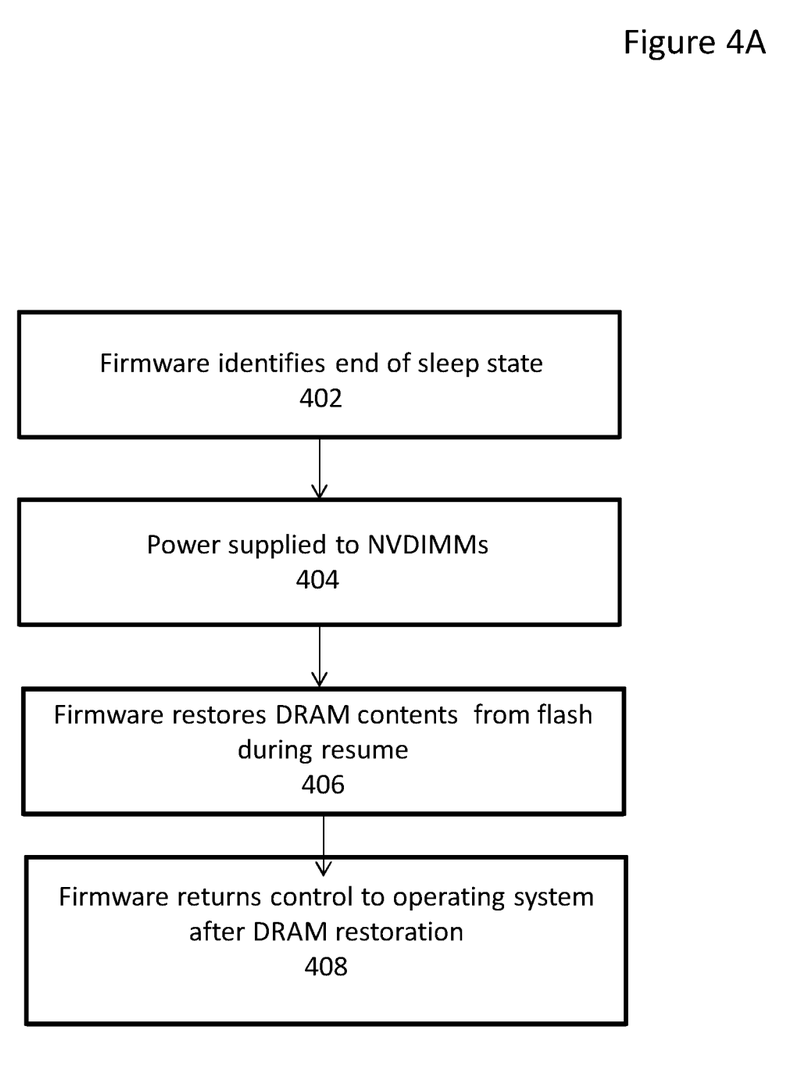
FIG. 4A depicts an exemplary sequence of steps performed to resume from a sleep state request in an exemplary embodiment.

FIG. 4A depicts an exemplary sequence of steps performed to resume from a sleep state request in an exemplary embodiment. The sequence begins with the firmware identifying the end of the sleep state (step 402). Based on the identifying, power is supplied to the one or more NVDIMMs in the computing device (step 404). The firmware then copies the flash contents back to DRAM on the NVDIMM as part of the resume process (step 406). After DRAM restoration, the firmware returns control to the operating system (step 408).

Figure 4B:
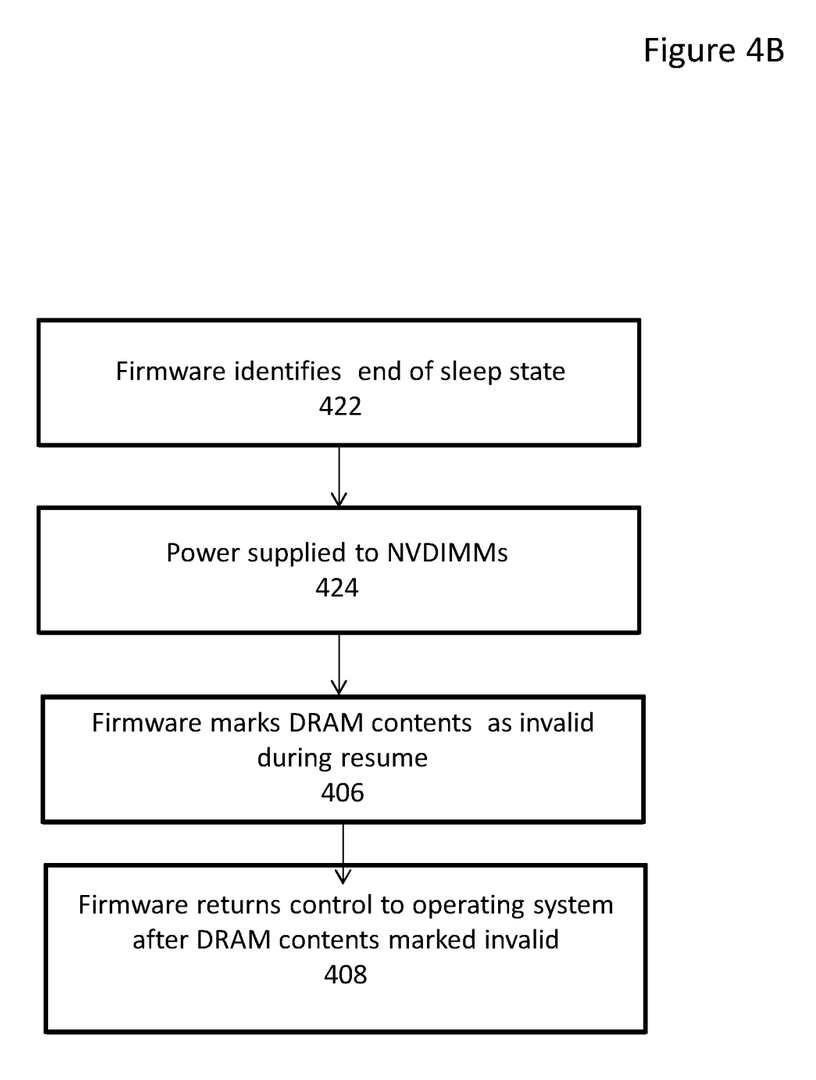
FIG. 4B depicts another exemplary sequence of steps performed to resume from a sleep state request in an exemplary embodiment.

Similarly, FIG. 4B depicts another exemplary sequence of steps performed to resume from a sleep state request in an exemplary embodiment. The sequence begins with the firmware identifying the end of the sleep state (step 422). Based on the identifying, power is supplied to the one or more NVDIMMs in the computing device (step 424). The firmware then marks the DRAM contents invalid as part of the resume process (step 406). As a result of the marking, future requests to access the memory location will fill the DRAM from flash at the time requested and avoid the copying of all of the flash contents during resume. After the DRAM contents are marked as invalid, the firmware returns control to the operating system (step 408).

In one embodiment, by using NVDIMMs that cover all of platform memory, the S3 process follows the normal process for restoring data to the DRAM (as optionally modified above) where the NVDIMM is made valid during the memory reference code (MRC) portion of the firmware execution during resume, except that instead of continuing down the normal boot path, a branch at the end of the Pre-EFI (PEI) initialization phase is taken because of S3 being detected. Embodiments also work with mixed DIMM/NVDIMM systems, except that the DIMMs are in self-refresh mode instead of being completely powered off and, therefore, the power savings are not as great as other embodiments described herein. In another embodiment, a chipset that completely powers off all NVDIMMs and has no DIMMs can further gain cost savings by shutting down portions of the memory controller and tri-stating the DRAM signals.

In another embodiment, using NVDIMMs that cover all of platform memory, firmware enhances an S4 sleep state. In a typical S4 sleep state, also known as suspend to disk, all of the current state data and memory contents are saved to non-volatile storage, typically a hard drive and the system is powered off. Upon resume, the normal BIOS POST executes and loads the OS loader, and the OS reads the memory contents from disk. In contrast, in one embodiment, because all DRAM data has already been propagated to non-volatile flash on the NVDIMM, there is no need to write data to the hard drive before entering S4 and no need to read the data back before resuming. As a result, the OS loader can shortcut the resume process because all of the memory contents are already available. The S4 resume process follows the normal process (as optionally modified above) where the NVDIMM is made valid during the memory reference code (MRC). In this embodiment optimizing the S4 sleep state, the computing platform also does not need super caps as there is no need to keep the DRAM powered long enough to write to disk or flash since the DRAM contents have previously been propagated to the flash. This configuration also increases the speed of the resume since there is also no need to wait for super capacitors to recharge or to make reads from disk to restore DRAM contents.

In an embodiment, the S4 sleep state is optimized using one or more NVDIMM-Fs (which acts like a hard disk) and the NVDIMM-F is used as an alternate to external non-volatile storage such as a hard drive.

In another embodiment, connected standby or the S0ix (or S1) sleep state can be optimized when all platform memory is tied to NVDIMMs as discussed above. Conventionally in these sleep states, the platform chipset and CPU are placed in low power state, but the CPU and DRAM maintain full context. That means the DRAM is still alive and drawing power. Resume times vary between 1-3 ms. This timing requirement is critical in order respond to interrupts generated while in the low power state with low latency. In one embodiment, power is reduced even further by turning off the NVDIMMs entirely while in these low power states. There ordinarily is an entire process which must be followed in a standard BIOS initialization sequence to make the DRAM on a DIMM that has been powered off (or even placed in self-refresh) available for usage. Normally, the operating systems do not contain such code and, even if they did, they could not use it since it is in the very DRAM that it is trying to restore. In order to meet the code requirements, in one embodiment the necessary portions of the MRC are placed in an auxiliary support processor. This processor has its own RAM and code resources that execute independently of the platform's main CPU. This processor also has access to the necessary signals needed to communicate with the NVDIMMs in order to perform the initialization sequence. An example of a processor with this type of capability is AMD's PSP. In another embodiment, the necessary code is loaded into non-volatile RAM, such as SRAM or the CPU's cache so that, when wakened, the platform's main CPU can perform the necessary steps itself. Upon completion of the necessary portions of the MRC, the platform resumes exactly where it was before. In another embodiment, the NVDIMMs contain logic to save their previous configuration (not data contents) and automatically restore it, in order to speed the resume process without requiring the full JEDEC init.

In one embodiment, when using an auxiliary support processer and stored MRC code when exiting the requested sleep state to make the one or more NVDIMMs available for usage as described above, all of the steps in the sequence described in FIG. 3 may be performed by the support processor. In an embodiment, the auxiliary support processor waits for the copy-to-flash to complete and starts the sleep process. Alternatively the firmware SMI handler may wait for the auxiliary support processor to report that the copy-to-flash is finished and then initiate the sleep process.

In another embodiment, the NVDIMM may have a smaller amount of DRAM that can be reconfigured so that it appears like an NVDIMM-N for the part that covers platform memory and an NVDIMM-F for the rest of the flash. In an additional embodiment, this functionality could be split across two separate NVDIMMs.

Figure 5:
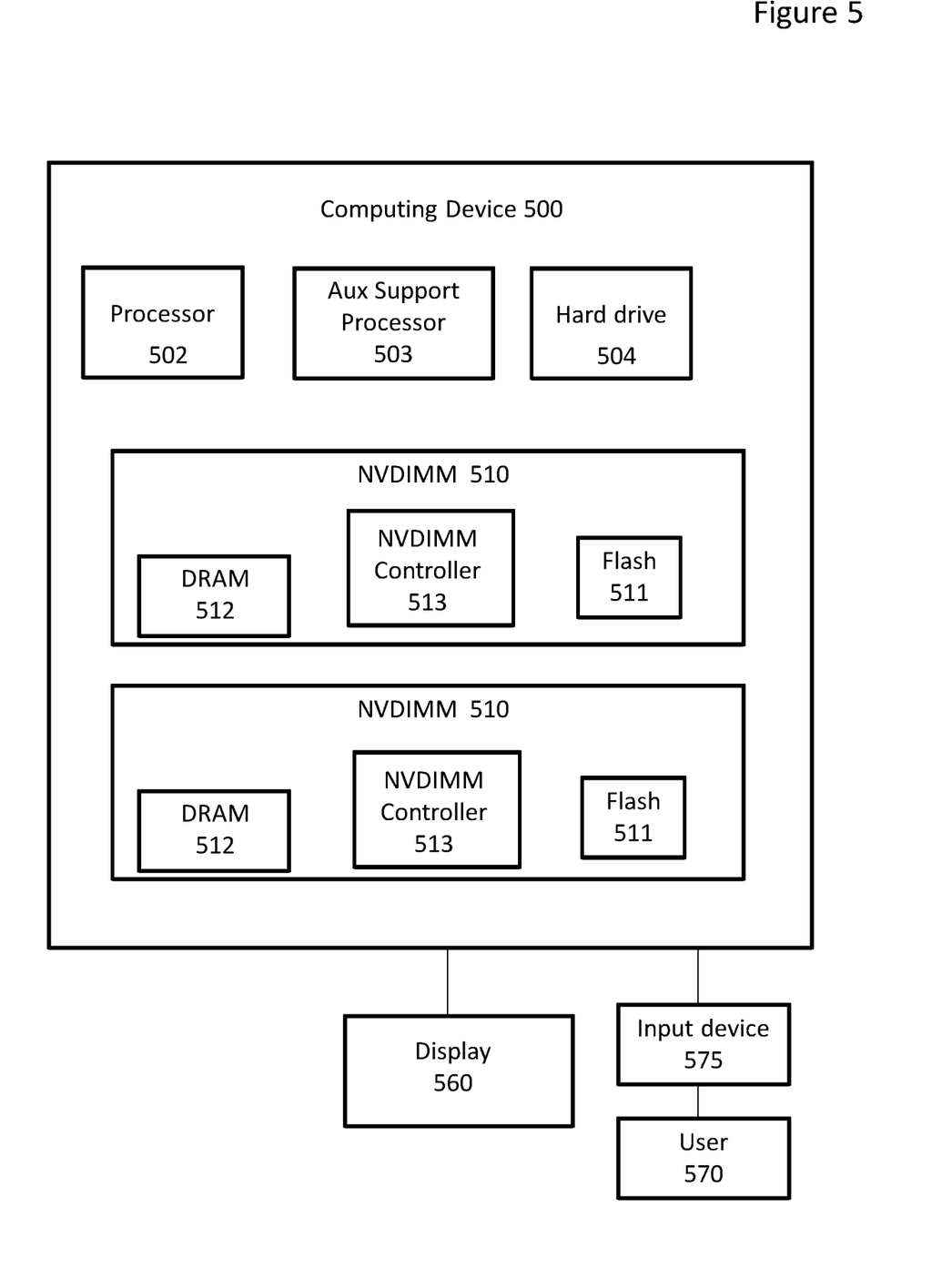
FIG. 5 depicts an exemplary computing device suitable for practicing an exemplary embodiment.

FIG. 5 depicts an exemplary computing device 500 suitable for practicing an exemplary embodiment. The computing device 500 includes processor 502, such as a CPU. Computing device may further include auxiliary support processor 503. Computing device 500 may also include a hard drive 504 and one or more NVDIMMs 510. Each of the NVDIMMs 510 includes flash memory 511, DRAM 512, and NVDIMM memory controller 513. In one embodiment, computing device 500 does not include super capacitors. Computing device may be communicatively coupled to a display 560 and may accept input from a user 570 via input device 575. Display 560 may be integrated with computing device 500 or may be a separate display surface. Input device 575 may be a touch screen, a keyboard, a pointer device or some other type of input device.

Portions or all of the embodiments of the present invention may be provided as one or more computer-readable programs or code embodied on or in one or more non-transitory mediums. The mediums may be, but are not limited to a hard disk, a compact disc, a digital versatile disc, ROM, PROM, EPROM, EEPROM, Flash memory, a RAM, or a magnetic tape. In general, the computer-readable programs or code may be implemented in any computing language.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

The foregoing description of example embodiments of the invention provides illustration and description, but is not intended to be exhaustive or to limit the invention to the precise form disclosed. Modifications and variations are possible in light of the above teachings or may be acquired from practice of the invention. For example, while a series of acts has been described, the order of the acts may be modified in other implementations consistent with the principles of the invention. Further, non-dependent acts may be performed in parallel.

We claim:

1. A computing device-implemented method for sleep state enhancement for a computing device using firmware and non-volatile dual inline memory modules (NVDIMMs), comprising:
    providing flash-backed Dynamic Random Access Memory (DRAM) for all of platform memory for the computing device via one or more NVDIMMs in the computing device, each of the one or more NVDIMMs including DRAM and flash memory and not connected to a supercapacitor;
    propagating all writes to DRAM to flash during operation of the computing device;
    detecting a sleep state request;
    generating a System Management Interrupt (SMI) based on the detected sleep state request;
    invoking a System Management Mode (SMM) based on the SMI;
    polling, with a firmware SMI handler operating in SMM, a status of a flash backup process responsible for propagating the writes to DRAM to flash;
    identifying a completion of the backup process based on the polling;
    powering off the one or more NVDIMMs prior to entering a sleep state associated with the sleep state request and after the completion of the backup process;
    entering the sleep state; and
    returning control of the computing device to an operating system when exiting the sleep state using the firmware.

2. The method of claim 1, further comprising
    restoring DRAM contents from flash with the firmware while resuming system operation.

3. The method of claim 1, further comprising:
    marking DRAM contents as invalid with the firmware while resuming system operation instead of restoring the contents from flash during the resuming of system operation, subsequent requests for DRAM access after resuming system operation being filled from the flash.

4. The method of claim 1, wherein the sleep state request is an S3 sleep state request.

5. The method of claim 1 wherein the sleep state request is an S4 sleep state request.

6. The method of claim 1, wherein the requested sleep state is connected standby, S0ix or S1 and further comprising:
    storing portions of Memory Reference Code (MRC) needed to make powered-off DRAM available for usage in an auxiliary support processor, the auxiliary support processor able to be executed independently of a main processor of the computing device; and
    using the stored MRC code when exiting the requested sleep state to make the one or more NVDIMMs available for usage.

7. A non-transitory medium holding computing device-executable instructions for sleep state enhancement of a computing device using firmware, the computing device including flash-backed Dynamic Random Access Memory (DRAM) for all of platform memory for the computing device provided via one or more non-volatile dual inline memory modules (NVDIMMs) in the computing device, each of the one or more NVDIMMs including DRAM and flash memory and not connected to a supercapacitor, the instructions when executed:
    propagating all writes to DRAM to flash during operation of the computing device;
    detecting a sleep state request;
    generating a System Management Interrupt (SMI) based on the detected sleep state request;
    invoking a System Management Mode (SMM) based on the SMI;
    polling, with a firmware SMI handler operating in SMM, a status of a flash backup process responsible for propagating the writes to DRAM to flash;
    identifying a completion of the backup process based on the polling;
    powering off the one or more NVDIMMs prior to entering a sleep state associated with the sleep state request and after the completion of the backup process;
    entering the sleep state; and
    returning control of the computing device to an operating system when exiting the sleep state using the firmware.

8. The medium of claim 7, wherein the instructions when executed further:
    restoring DRAM contents from flash with the firmware while resuming system operation.

9. Medium of claim 7, wherein the instructions when executed further:
  mark DRAM contents as invalid while resuming system operation instead of restoring the contents from flash during the resuming of system operation, subsequent requests for DRAM access after resuming system operation being filled from the flash.

10. The medium of claim 7, wherein the sleep state request is an S3 sleep state request.

11. The medium of claim 7 wherein the sleep state request is an S4 sleep state request.

12. The medium of claim 7, wherein the requested sleep state is connected standby, S0ix or S1 and wherein the instructions when executed further:
  stores portions of Memory Reference Code (MRC) needed to make powered-off DRAM available for usage in an auxiliary support processor, the auxiliary support processor able to be executed independently of a main processor of the computing device; and
  uses the stored MRC code when exiting the requested sleep state to make the one or more NVDIMMs available for usage.

13. A computing device configured to enhance sleep states using firmware, the computing device comprising:
  at least one processor;
  an operating system;
  one or more non-volatile dual inline memory modules (NVDIMMs) providing flash-backed Dynamic Random Access Memory (DRAM) for all of platform memory for the computing device, each of the one or more NVDIMMs including DRAM and flash memory and not connected to a supercapacitor, all writes to DRAM propagated to flash during operation of the computing device; and
  firmware, the firmware when executed:
    detecting a sleep state request,
    triggering a System Management Interrupt (SMI) based on the detected sleep state request that transitions the computing device to a System Management Mode (SMM),
    polling, with an SMI handler operating in SMM, a status of a flash backup process responsible for propagating the writes to DRAM to flash,
    identifying a completion of the backup process based on the polling,
  wherein the one or more NVDIMMs are powered off prior to entering a sleep state associated with the sleep state request and after the completion of the backup process and the computing device enters the sleep state, and
    returning control of the computing device to the operating system when exiting the sleep state.

14. The computing device of claim 13, wherein the firmware when executed further:
  restores DRAM contents from flash while resuming system operation.

15. The computing device of claim 13, wherein the firmware when executed further:
  marks DRAM contents as invalid while resuming system operation instead of restoring the contents from flash during the resuming of system operation, subsequent requests for DRAM access after resuming system operation being filled from the flash.

16. The computing device of claim 13, wherein the sleep state request is an S3 sleep state request.

17. The computing device of claim 13 wherein the sleep state request is an S4 sleep state request.

18. The computing device of claim 13, wherein the firmware when executed further:
  stores portions of Memory Reference Code (MRC) needed to make powered-off DRAM available for usage in an auxiliary support processor, the auxiliary support processor able to be executed independently of a main processor of the computing device; and
  uses the stored MRC code when exiting the requested sleep state to make the one or more NVDIMMs available for usage.

* * * * *